United States Patent

[11] 3,600,602

[72] Inventor Johnny W. Yartz
 Anchorage, Ky.
[21] Appl. No. 865,799
[22] Filed Oct. 13, 1969
[45] Patented Aug. 17, 1971
[73] Assignee General Electric Company

[54] CONTROL ARRANGEMENT FOR A WASHING MACHINE
 7 Claims, 4 Drawing Figs.
[52] U.S. Cl. .................................................. 307/141.8, 134/57
[51] Int. Cl. ..................................................... H01h 3/34
[50] Field of Search............................................ 307/141, 141.4, 141.8, 117; 134/57 D

[56] References Cited
 UNITED STATES PATENTS
 3,160,170 12/1964 Sampsel ..................... 134/57 D X Primary Examiner—Robert K. Schaefer
Assistant Examiner—H. J. Hohauser
Attorneys—George C. Atwell, Harry F. Manbeck, Jr., Frank L. Neuhauser, Oscar B. Waddell and Joseph B. Forman ABSTRACT: In an automatic washing machine, such as a dishwasher, having a timer control including cams for opening and closing predetermined combinations of switches whereby the electrical components of the machine are sequentially energized to provide an operational cycle, the circuit by which the motor of the timer control is energized is provided with at least two normally closed thermally responsive switches in series therewith. Each of the thermally responsive switches is adapted to be separately regulated manually and is arranged in the machine's circuitry such that, during a predetermined step of the machine's operational cycle, the motor circuit may be repeatedly interrupted to repeatedly halt the advancement of the timer control whereby the effective time duration of one or more of the electrical components operatively involved in the step is incrementally increased. Each of the thermally responsive switches is adaptively arranged in the circuitry to extend the effective operating time of those electrical components involved in a different specific step in the machine's operational cycle.

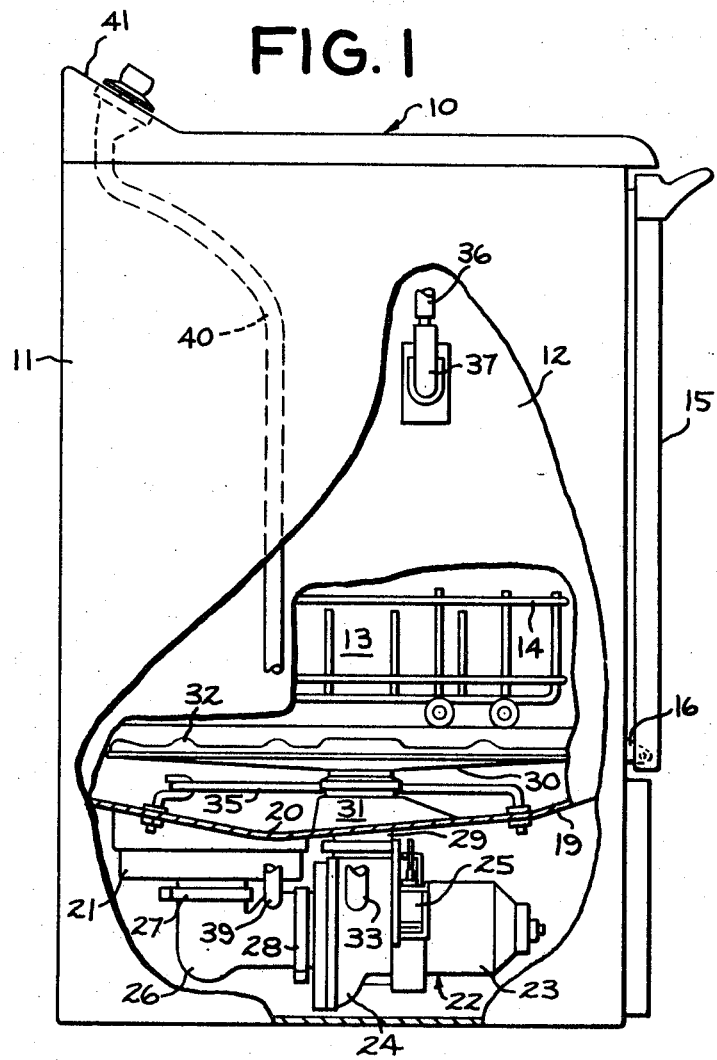

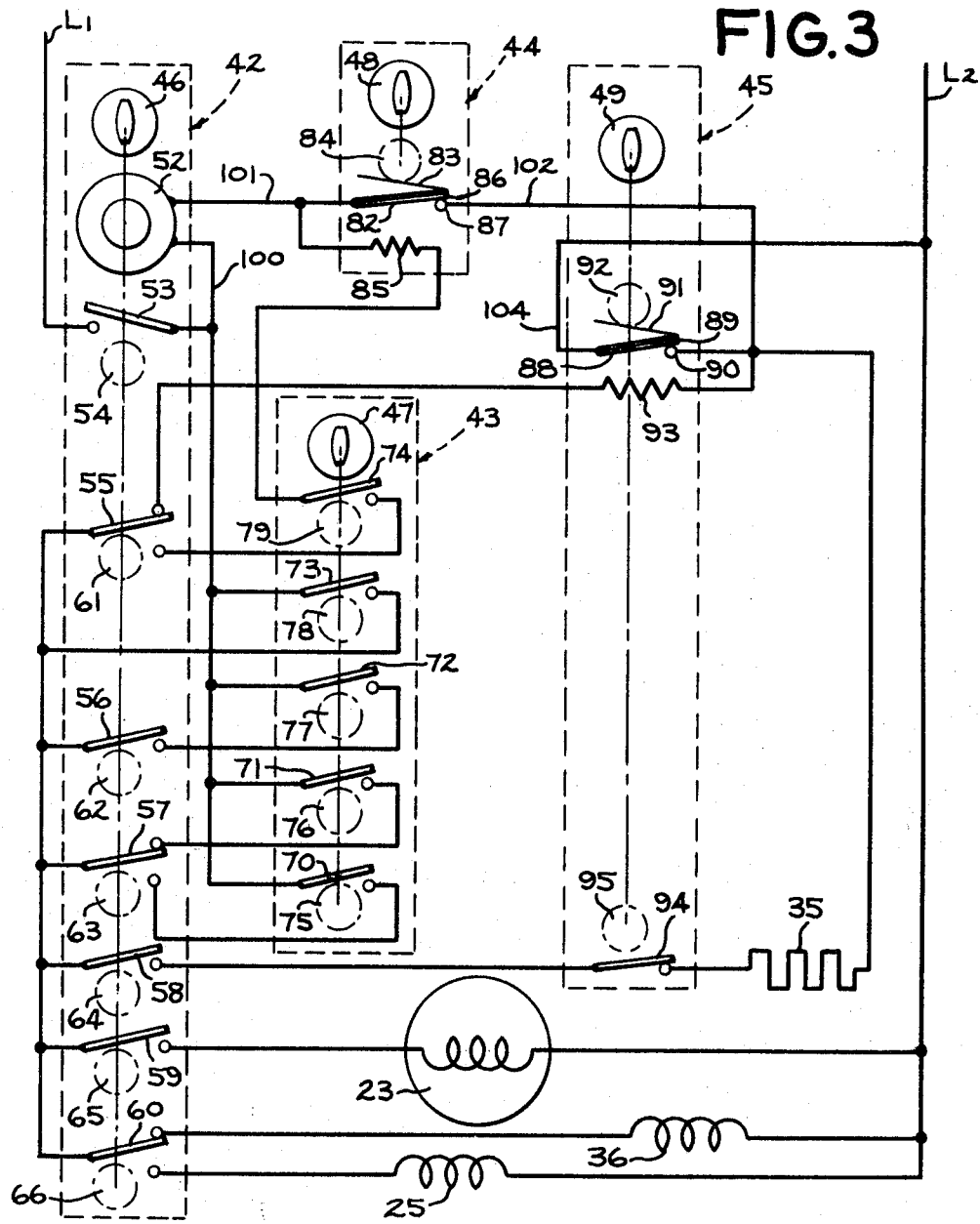

CONTROL ARRANGEMENT FOR A WASHING MACHINE

BACKGROUND OF THE INVENTION

This invention relates generally to automatic washing machines, and more particularly to control apparatus and circuitry in such machines for providing manual means of selectively extending sequential steps in the machine's operational cycle.

In the automatic control of applicances, particularly dishwashers, it has been found beneficial to provide operational cycles that are adjustable and selectable as to sequence of operation of the various electrical components of the machine and thereby make the operation of the machine more versatile in accomplishing the cleaning task for which it was designed. In the prior dishwasher art, in recognition of the desirability of cycle variance to enable a dishwasher to effectively clean a load of soiled utensils including heavily soiled pots and pans or only lightly soiled tableware, means have been included to permit selective shortening of the operational cycle to handle the lightly soiled items in a relatively shorter time. Selective cycle variation of this type has often required the use of a timer control mechanism having different and separate cycles designed into the mechanism itself. The typical timer control mechanism is structurally limited to provision of a certain number of different cycles after which further versatility of the machine cannot be obtained without substituting a much more expensive and elaborate timer control. Therefore, it is an object of this invention to provide means by which an automatic machine having a plurality of different operational cycles may be further provided with additional different cycles of operation without requiring the substitution of a more elaborate timer control means.

It is a more specific objective of the present invention to provide, in a washing machine having a washing step, a rinse step and a liquid extraction step in one or more of its operational cycles, separate control means for selectively varying certain of said steps during the operation of the machine.

It is a still further objective of the present invention to accomplish this goal without the need for any substantial increase in the cost of the machine, that is, to provide a more desirable versatile machine with substantially increased capabilities without requiring substantial increase in either the machine's cost or the number of components therein.

SUMMARY OF THE INVENTION

The present invention broadly pertains to a timer controlled automatic machine including a plurality of electrical components adapted to be sequentially energized either singly or in combination during operation of the machine. The sequential operation of the machine is caused or controlled by electric timer motor means. Electrical circuitry in the machine includes an energizing circuit for the electric timer motor means that has a plurality of normally closed contact means in series therewith. Each of the contact means has thermally responsive means therewith capable of opening the contact means upon sensing a predetermined amount of heat and to close the contact means when cool. Disposed adjacent each thermally responsive means is an electric heating means for generating heat to the thermally responsive means and thereby cause it to open its respective contact means. Each of the electric heating means is in series with the respective contact means operatively effected thereby so that opening of the respective contact means will allow the electric heating means in series therewith to cool.

The circuit for energizing the electric timer motor means has switch means in series therewith operatively driven to open and close by the electric timer motor means. The switch means driven by the electric timer motor means is adapted to be maintained closed for a predetermined period of motor means operation. During this predetermined period, one of the thermally responsive means, which is preferably adapted to be manually separately regulated, reacts to heat generated by its heating means and opens contact means in the energizing circuit of the electric timer motor means. The thermally responsive means then cools and completes the energizing circuit to the electric motor means and to its own heating means whereupon it is reheated to open the energizing circuit to the electric motor means once again. This opening and closing of the thermally responsive means continues repeatedly so long as the switch means driven by the electric timer motor means is maintained closed thereby. This repetition, which repeatedly interrupts the advancement of the electric timer motor means while permitting the particular operational step of the machine then in operation to continue without interruption, may serve to extend automatic operation of such electrical components involved in the step as compared to the length of time they would normally be automatically operated by the electric timer motor means in the absence of the repeatedly activated thermally responsive switch means in the timer motor means circuit. Providing a plurality of normally closed contact means, each having thermally responsive means therewith in the energizing circuit of the electric timer motor means, enables selective separate manual control of different steps in the machine's cycle.

BRIEF DESCRIPTION OF THE DRAWING

FIG. 1 is an elevational view taken from the side of an improved automatic dishwasher in accordance with the present invention, wherein portions of the sidewall are cut away to illustrate certain internal components of the dishwasher;

FIG. 2 is a fragmentary view of the control panel of the dishwasher shown in FIG. 1;

FIG. 3 is a schematic representation of the electrical circuitry in the dishwasher shown in FIG. 1; and FIG. 4 is a chart showing various cycles provided by implementation of the control means of the dishwasher shown in FIG. 1, in accordance with the present invention.

DESCRIPTION OF THE PREFERRED EMBODIMENT

Referring to FIG. 1, there is illustrated an automatic dishwasher 10 having an outer cabinet 11 and an inner cabinet 12. Inner cabinet 12 defines a washing chamber 13 which contains a pair of vertically spaced-apart dish supporting racks 14, only one of which is shown. Each rack is slidable outwardly from the chamber 13 and is adapted to receive and support articles to be washed within the washing chamber 13. A closure member or door 15 is pivotal about a substantially horizontal axis defined by a pair of hinges 16, only one of which is visible in FIG. 1. The door 15 provides access to the washing chamber 13 so that articles may be inserted into and removed from the racks 14.

It is also illustrated in FIG. 1 that the lower extremity of the washing chamber 13 has a floor or bottom wall 19 which gradually slopes to a low point 20. Downwardly adjacent the low point 20 is a sump 21 wherein washing liquid from the washing chamber 13 will tend to gravitate. Below the bottom wall 19 and supported therefrom is a motor-pump assembly 22 which includes an electric motor 23, a pump 24 and an electrically operated valve 25. The sump 21 and the inlet of the pump 24 are interconnected by a large diameter drainage conduit 26. The conduit 26 is secured to the lower outlet end of the sump 21 by the means of a clamp 27. The opposite end of the conduit 26 is secured to the intake or the inlet side of the housing of the pump 24. The main outlet of the pump 24 communicates with a conduit 29 leading to a rotatable spray arm 30 of the reaction-driven type. The conduit 29 extends upwardly through a humped portion 31 of the washing chamber's bottom wall 19 and serves as a pedestal on which the spray arm 30 is rotatably mounted.

The spray arm 30 comprises a horizontally elongated hollow body in communication with the conduit 29 and is provided with a plurality of spaced-apart orifices 32 in its upwardly facing surface which serve to discharge a spray of washing liquid therefrom and throughout the washing chamber 13. At least one of the orifices 32 is faced generally laterally relative to the longitudinal axis of the rotatable spray arm so that force of the liquid discharged therefrom exerts a counterforce upon the spray arm 30 and causes it to rotate relative to its pedestal 29.

The valve 25 of the pump 24, shown in FIG. 1, includes a pivotal valve element (not shown) within the housing of the pump 24 that is movable between two positions. In one of these positions, the movable valve element closes an effluent discharge conduit or drain outlet 33 and, at the same time, opens the pump's main outlet through the vertically oriented conduit 29. In the other of its two positions, the movable valve closes the pump's main outlet to the spray arm 30 and simultaneously opens the drain outlet 33 whereby effluent is discharged therethrough to the household sewage system.

An electrical resistance heating element 35 may be provided in the lower end of the washing chamber 13 for heating washing liquid accumulated in the lower end of the chamber and particularly before liquid extraction or drying of articles within the washing chamber 13 upon completion of the wash and rinse steps in the machine's operational cycle. Admittance of water to the chamber 13 is controlled by an electrical solenoid-type fill valve 36 (not shown in FIG. 1) referred to later in this specification. The water enters through a conduit 37 leading to a fill funnel 38. The funnel 38 is mounted between the inner cabinet 12 and the outer cabinet 11 in communication with an opening through the inner cabinet 12 whereby incoming water is directed into the washing chamber 13 so that it will gravitate downwardly to the chamber's lower end. The latter fill step occurs prior to each wash or rinse step in the operational cycle of the machine after which the motor 23 is energized to drive the pump 24 and continuous recirculate the liquid from the chamber 13 outwardly through the spray arm 30 onto the articles stored within the chamber 13.

Each rinse or wash step continues for a predetermined time after which the motor 23 is automatically deenergized followed by energization of the valve 25 which closes off the main pump outlet through the pedestal 29 and opens the effluent drain 33. The motor 23 is then reenergized whereby the effluent accumulated in the bottom of the chamber 13 is pumped outwardly to the household sewage system. As in most dishwashers of the type described, the rinse and wash steps differ primarily in the respective length of time alloted to each and the fact that detergent is added by automatic means (not shown) early in the wash step. A heating means such as heating element 35 may also be energized during the wash step to raise the temperature of the washing liquid and thereby increase its effectiveness.

The machine shown in FIG. 1 is also provided with a comparatively small aerator inlet 39 that communicates with the conduit 26 and has a tube 40 leading therefrom upwardly between the outer sidewall 11 and the inner sidewall 12 to the area behind the machine's control panel 41. The latter apparatus is provided in accordance with the teaching of L. W. Guth, in a copending application docket No. 9D-DW-9455, and assigned to the assignee of the present invention. As disclosed by Guth, this apparatus permits selective injection of ambient air at the intake side of pump 24 during a particular cycle of the machine whereby the energy level of the washing liquid pumped from the pump 24 is reduced to permit gentle washing of particularly fragile items.

In FIG. 2 a portion of the control panel 41 of the dishwasher 10 is shown. Mounted to the backside of control panel 41 are certain control means which are illustrated in the schematic diagram of FIG. 3. As shown in FIG. 3, the main control means of the dishwasher 10 is a sequence control means or timer motor control means 42 contained within a dotted line rectangle identified by the numeral 42. Another control means for the dishwasher 10 is a cycle selector switching device 43 illustrated in a dotted line rectangle identified by the numeral 43 in FIG. 3. In addition to the timer motor control means 42 and the cycle selector switching device 43, the dishwasher 10 is provided with control means or devices for selectively extending certain steps in the dishwasher's operational cycle. These control means are contained within respective dotted line rectangles identified by numerals 44 and 45 of FIG. 3. As illustrated both in FIGS. 2 and 3, manual control knobs 46, 47, 48 and 49 are provided whereby the operator of the dishwasher 10 can manually respectively operate control means 42, 43, 44 and 45.

The sequence control means 42 is a typical mechanism utilized for advancing a dishwasher through its operational cycle and comprises a synchronous timer motor 52 with switch operating means in the form of cams driven by the timer motor 52 which are disposed to operate a switch means controlling the energization of the electrical components heretofore described. The switch means of the sequence control means 42 includes a main power switch 53 adapted to be closed by movement of a cam 54 in order to initially place the dishwasher 10 into operation. This is accomplished by slightly advancing the control knob 46 in a counterclockwise direction which moves the cam 54 to close the switch 53 and thereby provide current to the timer motor 52. The switch means of the sequence control means 42 further includes switches 55, 56, 57, 58, 59 and 60 which are adapted to be respectively activated by cams 61, 62, 63, 64, 65 and 66. The plurality of sequence control cams, including cam 54 and cams 61—66, are not specifically shown as a unit; however, the manner in which they are driven by the timer motor 52 to sequentially operate the switches 53 and 55—59 is well known in the art. The cycle selector device 43 is also familiar in the art as a control means wherein turning a control knob such as the control knob 47 to any one of a number of panel-indicated positions closes the switches therein necessary to instigate a particular single cycle and at the same time cancels any earlier selected cycle. The control system utilized with the preferred embodiment of the present invention provides five separate cycles of operation as graphically portrayed in FIG. 4. FIG. 4 indicates that cycle selector device 43 will provide various cycle circuits by closing certain of the switches 70, 71, 72, 73, and 74 in respectively different combinations. The device 43 is adapted to be manually set to any one of its plurality of positions by rotation of the knob 47 as indicated in FIG. 2, and has internal detent means (not shown) for holding the chosen position until such time that a different cycle is selected.

As previously mentioned the control means of the dishwasher 10 also includes control means 44 and 45, shown in FIG. 3, each of which serves as a means to enable the operator to manually selectively vary the length of a particular step in the operation of the dishwasher. In its presently preferred embodiment, as shown by the circuitry of FIG. 3 and graphically depicted in FIG. 4, the present invention provides that the control means 44 is a device for selectively extending the wash steps in two of the cycles of operation provided for the dishwasher 10, (the "Normal" cycle and the "Economy" cycle) and the control means 45 serves as a device to permit selective variance of the liquid removal or drying step in all but one of the cycles (the "Rinse and Hold" cycle) provided in the dishwasher 10.

The selective variance of the wash and dry steps heretofore described is accomplished without effecting the "fill" and effluent draining activities in the operational cycle. Also uneffected is the rinse step or steps of each cycle.

The control means or device 44 includes a thermally responsive means or switch 82 in the form of a bimetallic element or switch in series with the energizing circuit for the timer motor 52. The bimetal element has a biasing means in the form of a leaf spring 83 associated therewith that is adapted to be biased toward the bimetallic element by means of a cam 84. The cam 84 is operatively linked to be driven by manipulation of the knob 48. The presently preferred construction of the thermally responsive means 82 is of a known type that includes a pair of metallic strips, each having a different coefficient of expansion relative to the other, laminated together whereby they form a heat sensitive device prone to curl or deflect in response to being heated. An electric heating means 85 is provided adjacent the thermally responsive means 82 whereby heat generated by the heating means will cause the means 82 to react and break contact between a contact point 86 on the end of the bimetallic element and a contact point 87.

The control means or device 45 includes a thermally responsive means or switch 88 also preferably in the form of a bimetallic element forming a normally closed switch between a contact 89 at the end of the bimetallic element and a contact 90. A biasing means in the form of a leaf spring 91 is associated with the bimetallic element and disposed to be biased by a cam 92 that is operatively linked to be driven by manipulation of the knob 49. Electric heating means 93 is provided to generate heat to the bimetallic element, and the device 45 further includes a switch 94 disposed to be opened or closed by a cam 95. The manner in which the devices 44 and 45 may be utilized to effect particular steps in the cycles of the dishwasher 10 will be developed hereinafter as a part of the description of the dishwasher when operated in one of its cycles.

The control system of the dishwasher 10 provides five separate cycles of operation, as graphically represented in FIG. 4. As indicated in the left-hand column of FIG. 4 there are five regular cycles of operation provided in the dishwasher 10 which are made possible by the utilization of various cycle circuits by closing certain of the switches 70—74 of the cycle selector device 43 in respectively different combinations. FIG. 2 shows that the knob 47 of the device 43 is adapted to be manually set to any one of a plurality of positions. The required combination of closed cycle switches is indicated in FIG. 4 for each cycle of the dishwasher. The different operating cycles of the dishwasher are entitled normal, rinse and hold, economy, delicate and mini-wash, and are so listed in FIG. 4. To the right of each listed cycle in FIG. 4 the combination of open and closed switches for that cycle are shown. A closed switch is indicated beneath the switch number by an "X," an open switch is indicated beneath the switch number by an "0," and, where it is immaterial whether a particular switch is open or closed during the cycle, this is indicated beneath the particular switch number in FIG. 4 by an "X" having an "O" superimposed thereon.

For example, the normal cycle is obtained by setting the selector knob 47 to the "N" designation thereon (FIG. 2). This action serves to close switches 73 and 74, as shown in FIG. 4. It is also shown in FIG. 4 that switches 70, 71 and 72 may be either opened or closed inasmuch as their disposition will have no effect on the normal cycle.

To place the dishwasher into operation in its normal cycle, the selector knob 47 is rotated whereby the "N" thereon is aligned with the adjacent pointer, as shown in FIG. 2, and then the main control knob 46 is rotated a few degrees counterclockwise to align a starting point 97 with its adjacent pointer. (It will be noted that knob 46 has two other starting points for use with comparatively shorter cycles). This latter operation serves to move the cam 54 of the sequence control means 42 whereby the main power switch 53 is closed to complete the energizing circuit to the timer motor 52. With the switches 73 and 74 closed as indicated for the normal cycle in FIG. 4, control of the operation of the motor 23, the heater 35, the diverter valve 25 and the fill valve 36 is placed in switches 58, 59, and 60 of the sequence control means 42. The cams of the sequence control means 42 controlling the latter switches are adapted to provide a sequence of operations which include, chronologically, a wash, a rinse, two successive washes, two successive rinses, and a final liquid removal or drying operation. The latter operational sequence is graphically set forth in FIG. 4 by a chart on the right-hand side of FIG. 4. It will be noted in FIG. 4 that each wash step is graphically indicated and thereon identified with the letter "W," each comparatively short rinse step is graphically represented following the first and third wash step although no letter designation is given to the rinse step, and each dry step is identified by the letter "D."

The circuitry shown in FIG. 3 is so arranged that during the normal cycle of operation control devices 44 and 45 are capable of effecting the wash step and the drying step of the cycle, respectively. It will be noted that with switches 73 and 74 of the cycle selector device 43 closed during the normal cycle, as indicated in FIG. 4, electric heating elements 85 and 93 may be energized separately depending upon the position of switch 55. Cam 61 is also capable of holding switch 55 at a nonclosed position, as during rinse steps of the cycle.

Thermally responsive switches 82 and 88, which are normally closed, are in series in the circuit for energizing the motor means 52.

The circuit for energizing the motor means 52 may be traced from the power supply conductor $L_1$ and through the closed main power switch 53 and a conductor 100 leading to the timer motor means 52. A conductor 101 connects the timer motor means 52 to the thermally responsive switch 82, and a conductor 102 connects the thermally responsive switch 82 to the thermally responsive switch 88. A conductor 104 connects the thermally responsive switch 88 to the poser supply conductor $L_2$, completing the motor means energizing circuit. The electric heating elements 85 and 93 are each connected in separate parallel circuits to the motor means energizing circuit. Also, the heating element 85 is in series with the thermally responsive switch 82 that responds to heat generated thereby, and the heating element 93 is in series with the thermally responsive switch 88 which is effective by heat generated thereby.

At the beginning of each wash step of the normal cycle in the operation of the dishwasher, the design of the cams in the sequence control means 42 is such that cam 61 will cause switch 55 to move to its downward position in FIG. 3 so that, with switch 74 closed, the electric heating element 85 will be energized during the wash step. Control knob 48 of the control device 44 is adapted to permit selective movement of cam 84 whereby the thermally responsive switch 82 may deflect in response to the heat generated by the heating element 85 and separate contacts 86 and 87 to interrupt the motor means energizing circuit. Such deflection of the thermally responsive switch 82 also breaks the circuit to the heating element 85 whereby the thermally responsive switch 82 is permitted to cool and reclose to complete the motor means energizing circuit. The latter action will continue to repeatedly occur with its frequency of occurrence depending upon the extent to which the leaf spring 83 is biased by the cam 84.

It should be noted that the cams 65 and 66 are formed such that for each wash step they will operate switches 59 and 60 to first open the fill valve 36 for a predetermined time after which the fill valve 36 is deenergized and the motor 23 is energized to commence the washing action in the wash chamber. The diverter valve 25 is, of course, energized to divert the washing fluid through the pump to the washing chamber just prior to the energization of the motor 23 and is then reenergized at the end of the wash step whereby the washing liquid is drained out of the machine. It should also be noted that cam 61 is preferably so formed that its switch 55 is moved to complete the circuit to the electric heating element 85 simultaneous with the closing of switch 59 to start the motor 23 and thereby commence the washing action in the machine's washing chamber. This is particularly important since it is not intended that the thermally responsive switch 82 should open the motor means energizing circuit while water fill or machine drainage is occurring.

As previously mentioned, knob 48 of the control device 44 may be manually rotated to increase or decrease the bias or deflection of the leaf spring 83 relative to the thermally responsive switch 82 in order to vary the frequency of response of the switch 82. In this manner the frequency and duration of the repeated energization and deenergization of the motor means 52 can be selectively varied. This enables the operator of the dishwasher to choose the length of time the total washing action of the cycle will take, in accordance with the nature and amount of soil on the items to be washed therein. It is preferred that an "Off" position be provided for the knob 48 where, in accordance therewith, the cam 84 will hold the leaf spring 83 at maximum deflection toward the thermally responsive means switch 82 thereby preventing it from opening and interrupting the motor means energizing circuit. Then, with the knob 48 in the "Off" position, normal or minimum wash time can be selectively obtained for each wash step in the cycle.

Near the end of the normal cycle, following drainage of the washing chamber after the last rinse step, switch 55 will move in accordance with the form of its cam 61 to complete a circuit to energize electric heating element 93 of the control device 45. Simultaneous with the foregoing occurrence, switch 58 is moved by its cam 64 to close and thereby complete an energizing circuit to heater 35. In series with the energizing circuit for heater 35 is the normally closed switch 94 and the thermally responsive switch 88. The electric heating element 93 is also connected in series with thermally responsive switch 88 whereby when the thermally responsive switch 88 deflects in response to heat generated by the electric heating element 93 and separates contacts 89 and 90, and the electric heating element 93 and the motor means 52 of the sequence control means 42 are thereby deenergized.

The thermally responsive switch 88 is arranged to repeatedly energize and deenergize the energizing circuit of the motor means 52 to thereby increase the total time of the drying step in the cycle. It should be noted that whereas in the wash step, wherein operation of the motor 23 continued despite the fact that the timer motor means 52 was being repeatedly stopped and restarted, constant energization of the heater 35 while the motor means 52 is being repeatedly stopped and restarted in not considered necessary since constant energization of the heater 35 is not a requisite for the drying process to continue in the dishwasher's chamber. In other words, during the brief intervals that the circuit to the heater 35 is broken by the deflected thermally responsive switch 88, the heater 35 does not have sufficient time to cool and substantial heat continues to be dissipated therefrom and into the washing chamber, thereby continuing the drying process.

The cam 92 of the control device 45 is formed whereby manual rotation of the knob 49 will vary the deflection of leaf spring 91 relative to the thermally responsive switch 88, giving the operator of the machine means by which to selectively vary the total time that the drying step may be extended. This variance may be from a normal drying time wherein the thermally responsive switch 88 would be prevented from separating the contacts 89 and 90 by extreme deflection of the leaf spring 91 to a full extension approximating twice the normal drying time. The cam 95 of the control device 45 is formed such that an "off" position may be selected (by turning knob 49 to point 106 shown on FIG. 2) whereby switch 94 is caused to open and remain so disposed during an entire operating cycle as, for instance, when the operator wishes to towel-dry items or allow them to dry slowly overnight.

In FIG. 4 the relative time of a normal cycle wherein both wash time and dry time are fully extended by selective manipulation of knobs 38 and 49 is graphically illustrated (shown in a bracket with the normal cycle). In the presently preferred embodiment of the improved dishwashing machine, in accordance with the present invention, switch 74 of the cycle selector device 43 is closed only during the normal and economy cycles. Since switch 74, when open, breaks the circuit to the electric heating element 85, it is impossible for the operator to vary the wash time during any but the normal and economy cycles.

FIG. 4 also shows the relative time for a complete economy cycle where only the wash time is extended, whereas the knob 49 of the device 45 is positioned to effect a normal nonextended dry time (this is shown in FIG. 4 in a bracket with the economy cycle). FIG. 4 also shows the time duration of a delicate wash cycle wherein control device 45 has been manipulated to open switch 94 and thereby eliminate the heater 35 from the entire cycle.

The delicate cycle, as explained in greater detail in the aforementioned copending application to Guth, is provided so that particularly fragile items may be washed in a relatively shorter cycle. Preferably, in accordance with the teachings of the copending Guth application, provision is made for introduction of air into the machine's pump during the delicate cycle whereby the energy level of the washing liquid is substantially reduced to protect the delicate items being washed. Now, in accordance with the present invention, the liquid removal or drying step of the delicate cycle, or any of the other cycles, may be varied or eliminated in accordance with the desire of the operator. Also, the length of the washing action may be varied and this may be accomplished with or without further addition of detergent for a particular wash step.

Since persons familiar with the art should have no difficulty either in interpreting the information provided graphically in FIG. 4 or in the practical application of the circuitry shown in FIG. 3, it is not believed necessary to describe each cycle obtainable in great detail. It is believed worth pointing out that experience with a dishwasher constructed in accordance with the present invention has impressively proven that increasing the wash time by the control system heretofore described is a relatively inexpensive way of obtaining cleaning results heretofore unattainable in a dishwasher utilizing the same sequence control means without a means of varying the time of the washing steps. Selective variance of the drying step has also been shown to be a desirable and beneficial feature. It will be observed that by the foregoing construction and by utilization of the circuitry described and shown, operation of the control devices 44 and 45 in combination with the cycle selection afforded by the cycle selector device 43 will, in addition to providing previously available variables, also provide selective versatility in washing and drying time which is tailored to the needs of the particular utensils to be washed in the dishwasher. It should be also observed that this may be obtained by means of relatively simple economically available additions to the previously provided typical sequential machine circuit wherein the use of thermally responsive means such as bimetallic elements with associated heating elements. These items are relatively inexpensive to purchase, keeping the additional cost of obtaining desirable and improved versatility at a minimum.

The foregoing description and the accompanying drawings pertain, in accordance with the patent statutes, to the preferred embodiment of the present invention. It is not intended that the invention be limited thereto since it will be obvious to those skilled in the art that various changes and modifications may be made without departing from the invention. It is therefore intended in the appended claims to cover all such changes and modifications as fall within the true spirit and scope of the invention.

What I claim as new and desire to secure by Letters Pat. of the United States is:

1. In a washing machine having a plurality of electrical components, an electrical timer motor means, and switch means responsive to the motor means such that the machine is adapted to be automatically conducted sequentially through an operational cycle including at least a wash step, a rinse step and a liquid removal step, means in combination therewith for selectively extending the duration of one or more of the steps, comprising:
   a. at least two normally closed thermally responsive switches in series in an energizing circuit for said motor means,
   b. means for selectively operatively connecting each of said thermally responsive switches to effect a particular one of the steps in the operational cycle,
   c. electric heating means adjacent said thermally responsive switches and connected thereto whereby opening of said thermally responsive switches is effective to deenergize said heating means, and
   d. each of said thermally responsive switches being adapted to repeatedly sequentially react to heat generated by said electric heating means so as to deenergize said motor means energizing circuit and an adjacent one one of said electric heating means and increase the time duration of said particular one of the steps effected thereby.

2. The combination defined in claim 1 including manual control means associated with a first of said thermally responsive means permitting selective variance of its reaction time.

3. The combination defined in claim 2 including a normally closed switches in series with said first thermally responsive switch and operable whereby it may be opened by the same one of said manual control means for selectively varying the reaction time of said first thermally responsive switch.

4. The combination defined in claim 1 wherein at least a first of said thermally responsive switch is provided with manual means for selectively preventing it from opening in response to energization of the one of said heating means adjacent thereto.

5. The combination defined in claim 1 further comprising control means associated with each of said thermally responsive switches, and each of said control means including a manually rotatable shaft having a cam formed to control the thermally responsive switch associated therewith.

6. In a machine:
a. a plurality of electrical components adapted to be sequentially energized during operation of the machine,
b. electric timer motor means for causing the sequential operation of said components,
c. a first circuit for energizing said motor means,
d. a plurality of normally closed contact means in series with said first circuit and each other,
e. each of said contact means having thermally responsive means therewith for opening said contact means upon sensing a predetermined amount of heat and for closing said contact means when cool,
f. electric heating means adjacent each of said thermally responsive means,
g. each of said heating means being in series with the contact means opened by its thermally responsive means whereby opening of said contact means will allow said electric heating means in series therewith to cool,
h. means to selectively prevent any one of said thermally responsive means from opening its contact means and to selectively permit one or more of said thermally responsive means to open its contact means,
i. each of said heating means being in a parallel circuit to said first circuit,
j. switch means connected in series with said first circuit, and
k. switch operating means driven by said motor means and controlling closing of said switch means, said switch operating means being adapted to maintain said switch means closed for a predetermined period of motor means operation during which, when any one of said heating means is energized to heat its adjacent thermally responsive means, said adjacent thermally responsive means will repeatedly open its contact means to thereby interrupt said first circuit and said circuit to said energized heating means and then cool and reclose its contact means so long as said switch means remains closed.

7. In combination with a machine:
a. electric timer motor means for causing a sequential operation of the machine,
b. a first circuit for energizing said motor means,
c. a first normally closed contact means in series with said first circuit,
d. a first thermally responsive means effective to open said first contact means upon sensing a predetermined amount of heat and to close said first contact means when cool,
e. a first electric heating means adjacent said first thermally responsive means and in series with said first contact means and in a second circuit in parallel with said first circuit,
f. a second normally closed contact means in series with said first circuit,
g. a second thermally responsive means effective to open said second contact means upon sensing a predetermined amount of heat and to close said second contact means when cool,
h. a second electric heating means adjacent said second thermally responsive means and in series with said first contact means and in a third circuit in parallel with said first circuit,
i. first switch means in said second circuit in series with said first heating means,
j. second switch means in said third circuit in series with said second heating means,
k. switch operating means driven by said motor means and controlling said first and second switch means, and
l. said switch operating means being adapted to maintain a selected one of said switching means closed for a predetermined period of motor means operation during which one of said heating means when energized heats the adjacent of said thermally responsive means to open its contact means so as to open said first and second circuits until the thermally responsive means cools enough for its contact means to close, whereby the length of time of the sequential operation is prolonged as compared to the duration of such sequential operation when said first circuit remains closed throughout the sequential operation.